United States Patent [19]

Cheng

[11] Patent Number: 4,858,940
[45] Date of Patent: Aug. 22, 1989

[54] STAIRWAY ACCESSIBLE CARRY CART WITH FOLDAWAY WHEELS

[76] Inventor: Chiun J. Cheng, No. 8, Alley 2, Lane 161, Sec. 2, Cheng Kung Rd., Yung Ho City, Taipei Hsien, Taiwan

[21] Appl. No.: 169,343

[22] Filed: Mar. 17, 1988

[51] Int. Cl.⁴ .............................................. B62B 5/02
[52] U.S. Cl. ...................................... 280/5.2; 280/39; 280/655; 280/47.2
[58] Field of Search ............... 280/638, 35, 38, 39, 280/641, 643, 645, 646, 651, 654, 655, 47.17, 47.18, 47.23, 47.24, 75.2, 5.28, 47.2, 763.1; 16/34, 302, 307

[56] References Cited

U.S. PATENT DOCUMENTS

| | | | |
|---|---|---|---|
| 3,865,392 | 2/1975 | Hartway | 280/35 |
| 4,310,166 | 1/1982 | Eicher | 280/5.28 |
| a4,435,115 | 3/1984 | Orstad et al. | 280/655 |

Primary Examiner—Charles A. Marmor
Assistant Examiner—Richard Comby
Attorney, Agent, or Firm—Staas & Halsey

[57] ABSTRACT

A carry cart having auxiliary wheels on the lower portion of its telescoping arms for redistributing the load of the carry cart when going stairs or the like. The auxiliary wheels are each spring-loaded by two-way hinges. The hinges each include an upper left and upper right plate, a lower left and lower right plate, four springs and four rods.

1 Claim, 8 Drawing Sheets

STAIRWAY ACCESSIBLE CARRY CART WITH FOLDAWAY WHEELS

BACKGROUND OF THE INVENTION

1. Field of the Invention

This invention relates to carry carts for carrying luggage or the like, and in particular, to a carry cart with auxiliary foldaway wheels on the back side thereof for use when going up stairs.

2. Description of the Related Art

In the past, luggage carts have been available to the general public, but they have all had the distinct disadvantage that they were not suited for pulling or rolling up stairs because the user himself had to bear almost the entire weight of the load, rather than being able to shift the weight of the load to the next step or level.

It is the purpose of this present invention, therefore, to mitigate and/or obviate the above-mentioned drawbacks in the manner set forth in the detailed description of the preferred embodiment.

SUMMARY OF THE INVENTION

A primary objective of this invention is to provide a luggage cart or the like which is stairway accessible.

Another objective of this invention is to provide such a luggage cart or the like which has foldaway wheels on the rear side thereof.

A further objective of this invention is to provide such a luggage cart or the like with foldaway wheels wherein the wheels can be locked in place.

Further objectives and advantages of the present invention will become apparent as the following description proceeds, and the features of novelty which characterize the invention are pointed out with particularity in the claims annexed to and forming a part of this invention.

DETAILED DESCRIPTION OF THE PREFERRED EMBODIMENT

Figure 1:
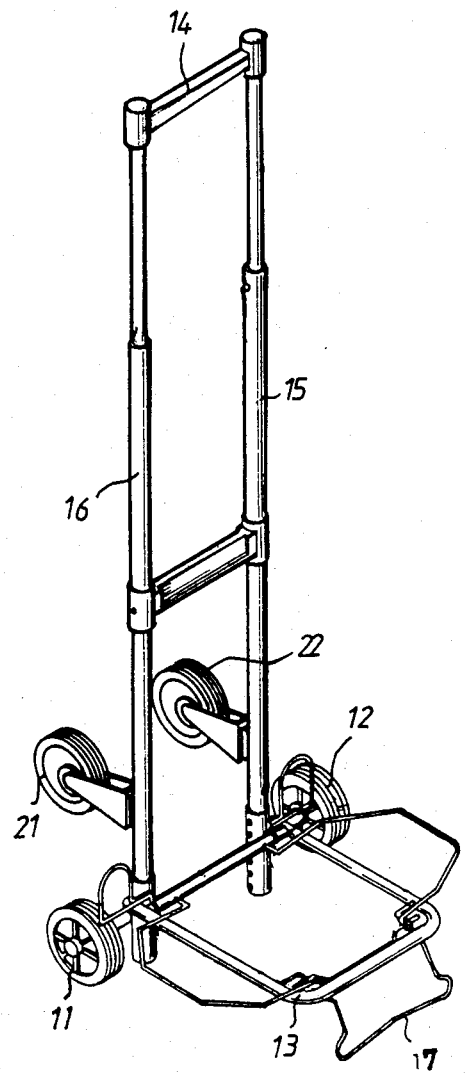
FIG. 1 is a perspective view of a luggage cart or the like in accordance with the present invention.

Referring to FIG. 1, it can be seen that the present invention is used in conjunction with a carry cart or the like and as such comprises: telescoping arms 15 and 16, a support frame 13 at the lower end thereof, primary wheels 11 and 12 at the lower end of said telescoping arms (15, 16), auxiliary wheels 21 and 22, retaining wires 17 and of course a handle 14 at the upper end thereof. The novel features of this invention over the prior art have to do primarily with the auxiliary wheels 21, 22 and the foldability thereof.

As can be seen clearly in FIG. 1, the auxiliary wheels 21, 22 are extendable rearwardly from the telescoping arms 15, 16 and are each rotatably supported by a respective wheel support 3. Further referring to FIG. 2, it can be understood that the auxiliary wheels 21, 22 can be folded inwardly toward the opposite telescoping arms, 16 and 15, respectively.

Figure 2:
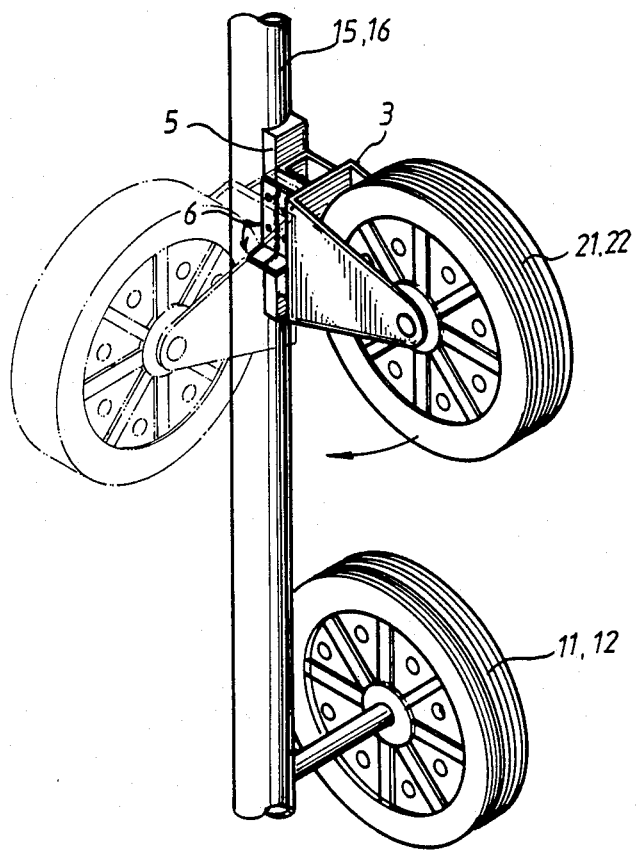
FIG. 2 is a cutaway perspective view of a wheel and telescoping arm in accordance with the present invention.
Figure 3:
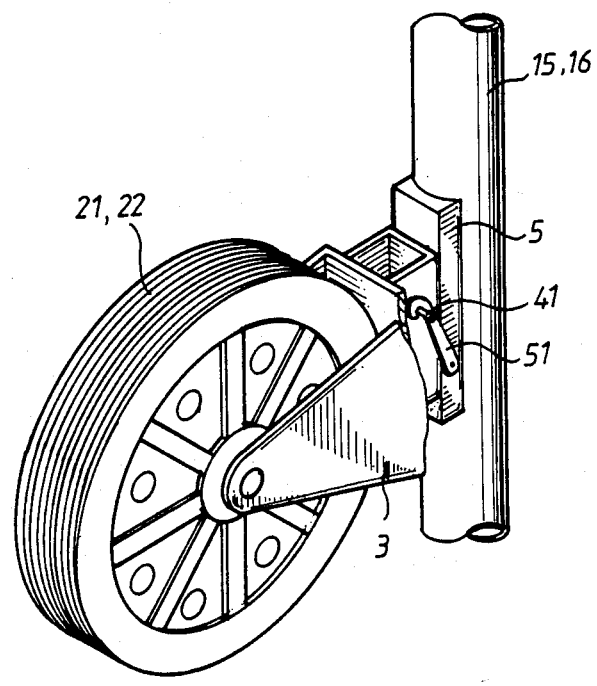
FIG. 3 is a cutaway perspective view of an auxiliary wheel locked into place by a safety hook in accordance with the present invention.

From FIGS. 2 and 3, the support blocks 5 of the present invention can be better understood. A support block 5 is fixed on each of the telescoping arms (15, 16) at the lower end thereof. One end of the support block 5 is curved and one end is flat, so that it can match the top (distal) surface of the wheel support 3, which is also flat. The support blocks 5 are in vertical alignment with each other. Each support block 5 has a safety hook 51 on one side thereof for latching a respective pin 41 extending from the wheel support 3, which rotatably supports a respective auxiliary wheel (21, 22), so as to prevent said auxiliary wheel from slipping out of place when in use.

Figure 4:
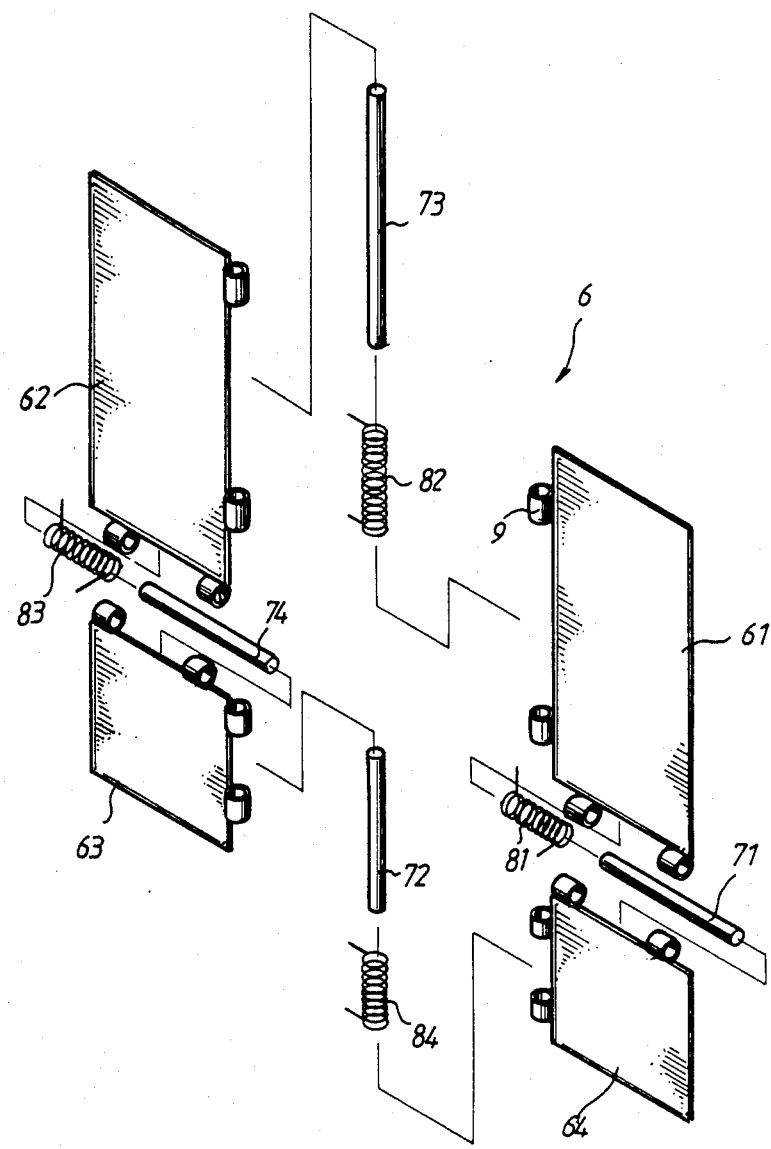
FIG. 4 is an exploded view of a two-way hinge in accordance with the present invention.
Figure 5:
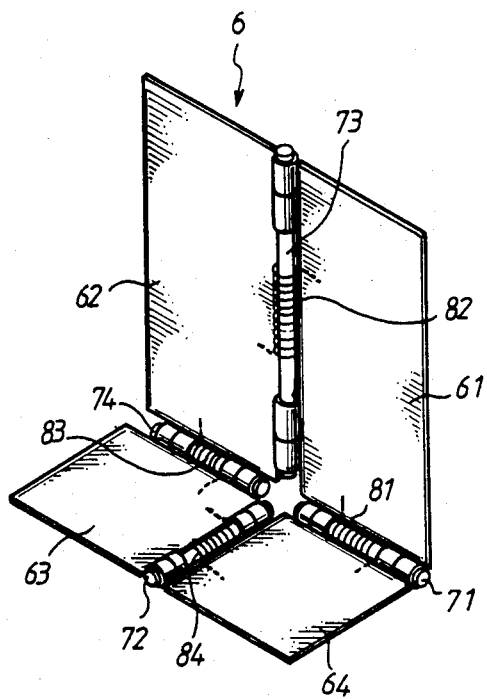
FIG. 5 is a perspective view of the two-way hinge of FIG. 4 in horizontally folded position.
Figure 6:
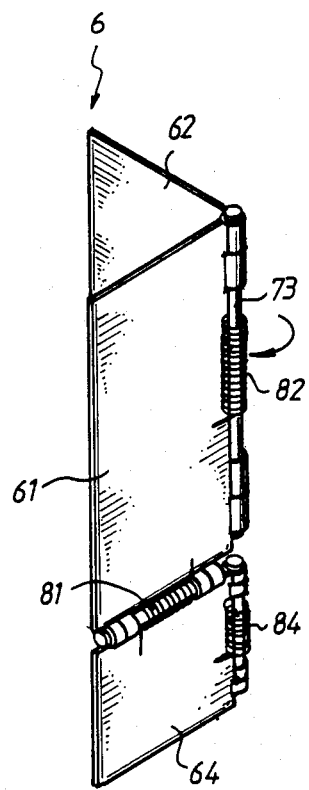
FIG. 6 is a second perspective view of the two way hinge of FIG. 4, showing vertical folding thereof.
Figure 7:
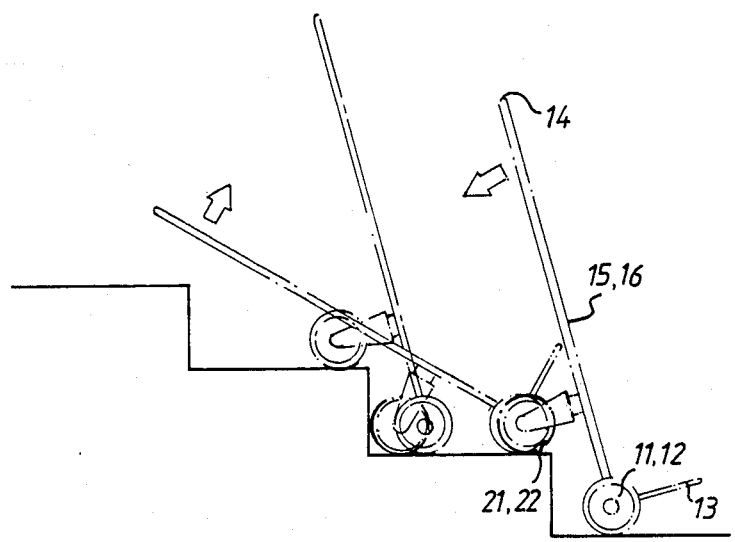
FIG. 7 is an elevational working view of a luggage cart or the like in accordance with the present invention.

Referring now to FIGS. 4, 5, and 6, the structure and operation of the two-way hinge 6 can be seen. The two-way hinge comprises an upper left plate 62, an upper right plate 61, a lower left plate 63, a lower right plate 62, four springs 81, 82, 83 and 84, and four rods 71, 72, 73 and 74. One of each of the upper plates 61, 62 is fixed to a lateral side of the support block 5 and the other complementary plate 62, 61 is fixed to a respective wheel support 3. The two-way hinge 6 is biased to a 90 degree fold about its horizontal axis (as seen in FIG. 5) and is biased to a folded position its vertical axis (as shown in FIG. 6). In other words, springs 81 and 83 are biased to a 90 degree fold between the upper and lower right plate 61 and 64. Springs 82 and 84, on the other hand, are biased to a completely folded position between the upper plates 61 and 62, and between the lower plates 63 and 64, respectively. Obviously, when the two-way hinge is folded about its horizontal axis, it can not be folded about its vertical axis, and vice-versa. In fact, as shown in FIG. 2, when the two-way hinge is folded about its horizontal axis (i.e., rods 71 and 74), it cannot be folded about its vertical axis (i.e. rods 72 and 73), since the lower plates 63, 64 are coplanar and adjacent to each other in an orientation 90 degrees from the upper plates 61, 62 thereby acting as a safety feature for increasing the stability of the two-way hinge 6. FIG. 3 shows that the present invention also uses a pin 41 and a safety hook 51 to keep the auxiliary wheels 21, 22 in place once they are placed in the USE position shown in FIGS. 1 and 2, as an added safety feature. When it is desired to fold the auxiliary wheel (21 or 22) to its NON-USE position (shown in phantom lines), the user simply unlatches the safety hook 51 from the pin 41 and then (refer back to FIG. 2) press down the two-way hinge 6 so that the same can be folded back to its NON-USE position (shown in phantom lines).

Figure 8:
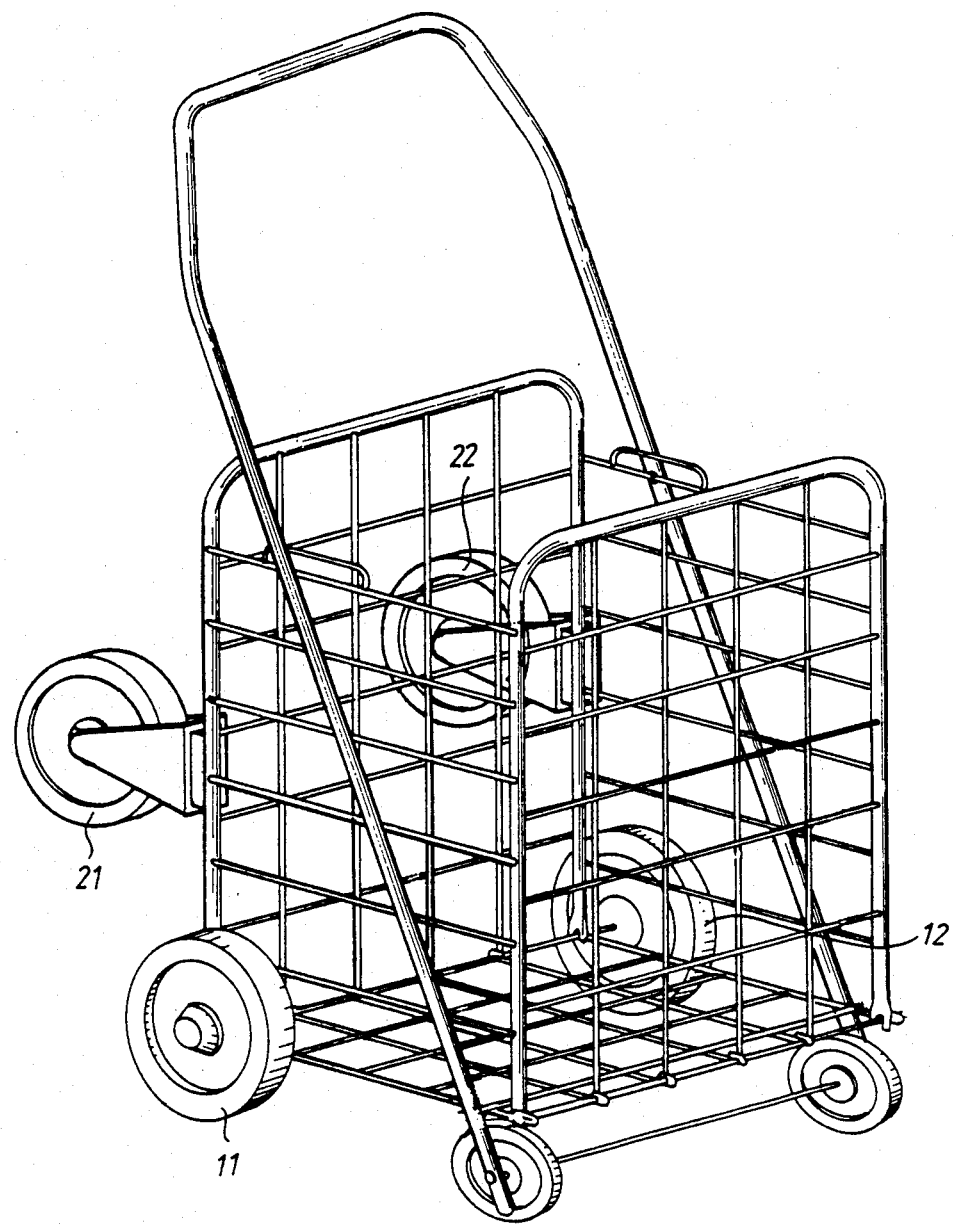
FIG. 8 is a perspective view of a shopping cart incorporating the fold away wheels of the invention.

As various possible embodiments might be made of the above invention without departing from the scope of the invention, it is to be understood that all matter herein described or shown in the accompanying drawing is to be interpreted as illustrative and not in a limiting sense. For instance, the foldaway auxiliary wheels could have just as easily have been incorporated on a baby stroller, shopping cart, suitcase, etc. as per FIG. 8.

Thus it will be appreciated that the drawings are exemplary of a preferred embodiment of the invention.

I claim:

1. A carry cart or the like comprising a main frame with a handle portion at an upper end thereof and a support frame (13) at a lower end thereof, primary wheels (12, 11) being fixed to said lower end of said main frame, the improvement comprising:

foldaway auxiliary wheels (21) which in extended state project rearwardly from said lower portion of said main frame; each of said foldaway auxiliary wheels (21) being rotatably supported by a respective wheel support (3);

support blocks (5) being fixed in vertical alignment at lower positions of said main frame, each of said support blocks (5) having a safety hook (51) protruding therefrom;

said foldaway auxiliary wheels (21) being foldable about two-way hinges (6); each of said two-way hinges including upper plates (61, 62) which are complementary to each other, said upper plates (61, 62) further comprising an upper left plate (62) and an upper right plate (61), lower plates (63, 64), said lower plates (63, 64) further comprising a lower left plate (63) and a lower right plate (64), four rods (71, 72, 73, and 74), and four springs (81, 82, 83, and 84); one of said respective upper plates (61, 62) being fixed to a lateral side of said support block (5); said upper plate (62, 61) being fixed to said wheel supports (3); and auxiliary wheels (21, 22) which are each fixed on and pivotable about said upper plate (62, 61) of said two-way hinges (6), a pin (41) extending from said wheel support (3) so that said safety hook (51) is latchable thereto to prevent said auxiliary wheel (21, 22) from slipping out of place when in use.

* * * * *